United States Patent [19]

Kishida et al.

[11] Patent Number: 4,561,394
[45] Date of Patent: Dec. 31, 1985

[54] AIR INTAKE SIDE SECONDARY AIR SUPPLY SYSTEM FOR AN INTERNAL COMBUSTION ENGINE

[75] Inventors: Eiji Kishida, Tokyo; Masahiko Asakura, Tokorozawa, both of Japan

[73] Assignee: Honda Giken Kogyo Kabushiki Kaisha, Tokyo, Japan

[21] Appl. No.: 652,189

[22] Filed: Sep. 19, 1984

[30] Foreign Application Priority Data

Sep. 20, 1983 [JP] Japan ............................ 58-145251[U]

[51] Int. Cl.⁴ .......................... F02M 1/02; F02M 23/10
[52] U.S. Cl. ................................. 123/179 G; 123/587; 123/588
[58] Field of Search ................................. 123/585–589, 123/179 B, 179 G; 261/39 B, 64 E

[56] References Cited

U.S. PATENT DOCUMENTS 4,334,515  6/1982  Otsuka ................................. 123/588
4,369,755  1/1983  Saito ................................... 123/588
4,484,552 11/1984  Kobayashi et al. ................. 123/588

Primary Examiner—William A. Cuchlinski, Jr.
Attorney, Agent, or Firm—Birch, Stewart, Kolasch & Birch

[57] ABSTRACT

An air intake side secondary air supply system for an internal combustion engine equipped with an automatic choke valve and a fast idle system is provided with a detection means for detecting an operating condition of the engine in which the fast idle system is operated to open the throttle valve. The supply of the secondary air for the feedback control is stopped when a detection signal is produced by the detection means so that the feedback control of the air-fuel ratio is suspended when the throttle valve is opened by means of the fast idle system while the choke valve may be substantially closed. Thus, a hunting of the engine speed which might have occured after the start of the feedback control is prevented.

4 Claims, 4 Drawing Figures

AIR INTAKE SIDE SECONDARY AIR SUPPLY SYSTEM FOR AN INTERNAL COMBUSTION ENGINE

BACKGROUND OF THE INVENTION

1. Field of the Invention

The present invention relates to an air-fuel ratio control system for an internal combustion engine, and more specifically to the so-called air intake side secondary air supply system for an internal combustion engine having an atomatic choke valve and a fast idle system.

2. Description of Background Information

In an internal combustion engine provided with a three-way catalytic converter in the exhaust system, the air-fuel ratio of the engine is controlled around a stoichiometric value (14.7:1 for example) by a feedback control in accordance with the composition of the exhaust gas and operating conditions of the engine since an optimum operation of the three-way catalytic converter is enabled at the stoichiometric air-fuel ratio. The air intake side secondary air supply system is a system for the feedback control of air-fuel ratio, in which the air-fuel ratio is controlled by varying the amount of a secondary air through a secondary air passage connected to the carburetor on the downstream side of the throttle valve. In the air intake side secondary air supply system, the feedback control of the air-fuel ratio is stopped by suspending the supply of the air intake side secondary air during a period of the cold operation of the engine, and in such a period when the throttle valve is substantially fully closed because the engine operation tends to be unstable during such periods. The cold operation of the engine is detected as such a state that the intake air temperature is below a first predetermined temperature level (18 deg. C. for example) and that the engine coolant temperature is below a second predetermined level (70 deg. C. for example) even though the intake air temperature is above the first predetermined level. By stopping the supply of the intake side secondary air, the air-fuel ratio is controlled to the rich side and a stable operation of the engine is secured. In the conventional arrangement, the condition for starting the feedback control of the air-fuel ratio after the cold start of the engine is detected when the throttle valve is opened wider than a predetermine level. However if the engine is equipped with an automatic choke valve and a fast idle system in the air intake system, the choke valve may remain closed when the throttle valve is opened by the fast idle system and the engine coolant temperature has reached a temperature level for the start of the feedback control of the air-fuel ratio. If the air intake side secondary air is supplied in such a state, the engine speed will be raised abruptly to cause a hunting, and the driveability of the engine will be greately spoiled.

SUMMARY OF THE INVENTION

An object of the invention is therefore to alleviate this problem of the conventional system and to provide an air intake side secondary air supply system in which measures are taken to prevent the hunting of the engine speed when the engine is idling after the cold start, whereby improving the driveablity of the engine.

According to the present invention, the air intake side secondary air supply system is constructed to detect an operating condition of the engine in which the fast idle system is activated to open the throttle valve. The supply of the air intake side secondary air on the downstream side of the throttle valve is stopped when such a condition is detected, and the air-fuel ratio of the mixture to be supplied to the engine is controlled to the rich side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparanet to those skilled in the art from this detailed description.

BRIEF DESCRIPTION OF THE DRAWINGS

The foregoing and other objects and advantages of the invention will become more clearly understood from the following description taken in conjunction with the accompanying drawing which are given by way of illusration only, and thus are not limitative of the present invention, and wherein.

DETAILED DESCRIPTION OF THE PREFERRED EMBODIMENT

Figure 1:
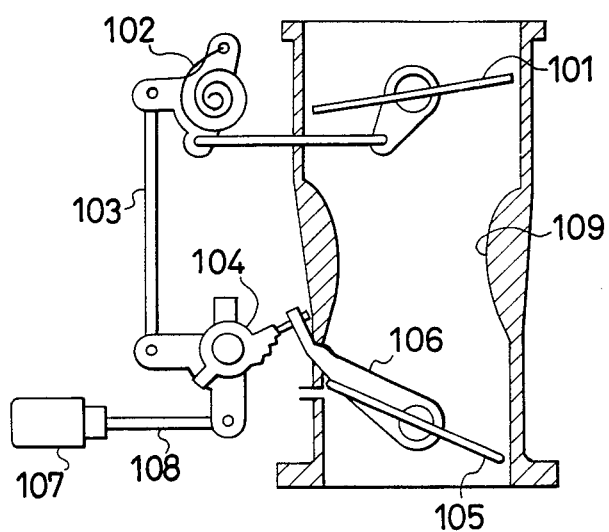
FIG. 1 is a schematic diagram showing an example of the construction of the air intake system of an internal combustion engine having a choke valve and a fast idle system.

Before entering into the explanation of the preferred embodimnt of the present invention, reference is first made to FIG. 1 in which the construction of an example of the air intake system having an automatic choke valve and a fast idle system is illustrated.

As shown, a choke valve 101 is rotatably disposed in the intake air passage, on the upstream side of the venturi 109. To cause a rotation of the choke valve 101, a bimetalic coil 102 is provided so that the choke valve is opened by the movement of the bimetalic coil as the increase of the intake air temperature. In addition, a fast idle system including a fast idle lever 106 connected to a throttle valve 105 and a fast idle cam 104 is provided for raising an idle speed of the engine during the cold start period. In order to transmit the movement of the bimetalic coil 102 to the fast idle cam 104, a rod 103 is provided.

When an acceleration pedal is once pressed and then released prior to the start of the engine, the fast idle cam 104 comes to engage with a pin mounted on an end of the fast idle lever 106 connected with the throttle valve 105, and the throttle valve 105 is maintained at an opening angle corresponding to the intake air temperature and suited for the start of the engine. Further, a wax case 107 containing a wax pellet is provided and a rod 108 is provided to transmit the change in the volume of the wax pellet to the fast idle cam 104. As the temperature of the engine coolant increases after the start of the engine, the wax pellet in the wax case 107 is inflated and the rod 108 is moved to the fast idle cam 104. Thus the fast idle cam 104 is rotated and the position of the engagement between the fast idle cam and the fast idle lever is changed to provide a desirable opening angle of the throttle valve 105 suited for the engine operation with the engine coolant temperature of the moment.

Figure 2:
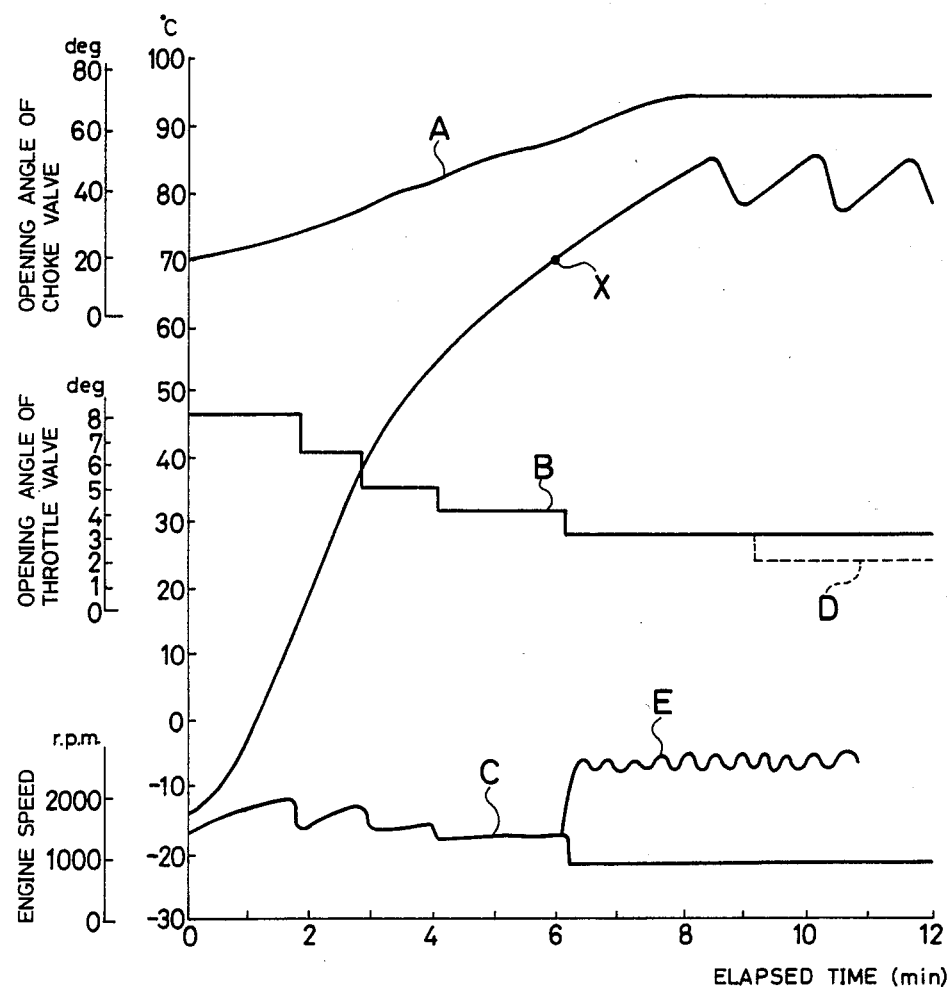
FIG. 2 is a diagram showing the manner of variation of the engine coolant temperature with respect to the time elapsed after the cold start of the engine.

FIG. 2 is a graph showing the manner of the variation of the engine coolant temperature with respect to the time duration after the start of the engine under a condition where the engine coolant temperature is at −15 deg. C. before the start of the engine. Further, the variations of the opening angles of the choke valve and the throttle valve, and the engine speed are illustrated in the same graph of FIG. 2.

The opening angle of the choke valve varies in a manner as shown by the solid line A. The solid line B indicates that the opening angle of the throttle valve is varied stepwise by the fast idle system. The dashed line D indicates an idle openging angle of the throttle valve where the fast idle system is not operated. In addition, the engine speed varies as shown by the soild line C.

If the engine coolant temperature is initially below the afore mentioned second predeterimined level at the time of the start of the engine, and gradually raised and reached the second predetermined level while the engine warms up after the starting, as exemplary shown by the point X of the figure, the throttle valve is opened wider than the predetermined opening angle due to the operation of the fast idle system. Therefore, in the case of the air-fuel ratio control system in which the condition for starting the air-fuel ratio feedback control is detected when the throttle valve is opened wider than the predetermined opening angle, the air intake side secondary air is supplied to the engine because the condition for starting the feedback control is satisfied.

However, since the choke valve is not fully opened when the engine coolant temperature has reached the second predetermined temperature level, the supply of the air intake side secondary air under this condition will result in an abrupt increase of the engine speed, and further in the hunting of the engine rotation.

The preferred embodiment of the present invention will be described hereinafter with reference to FIGS. 3 and 4 of the accompanying drawings.

Figure 3:
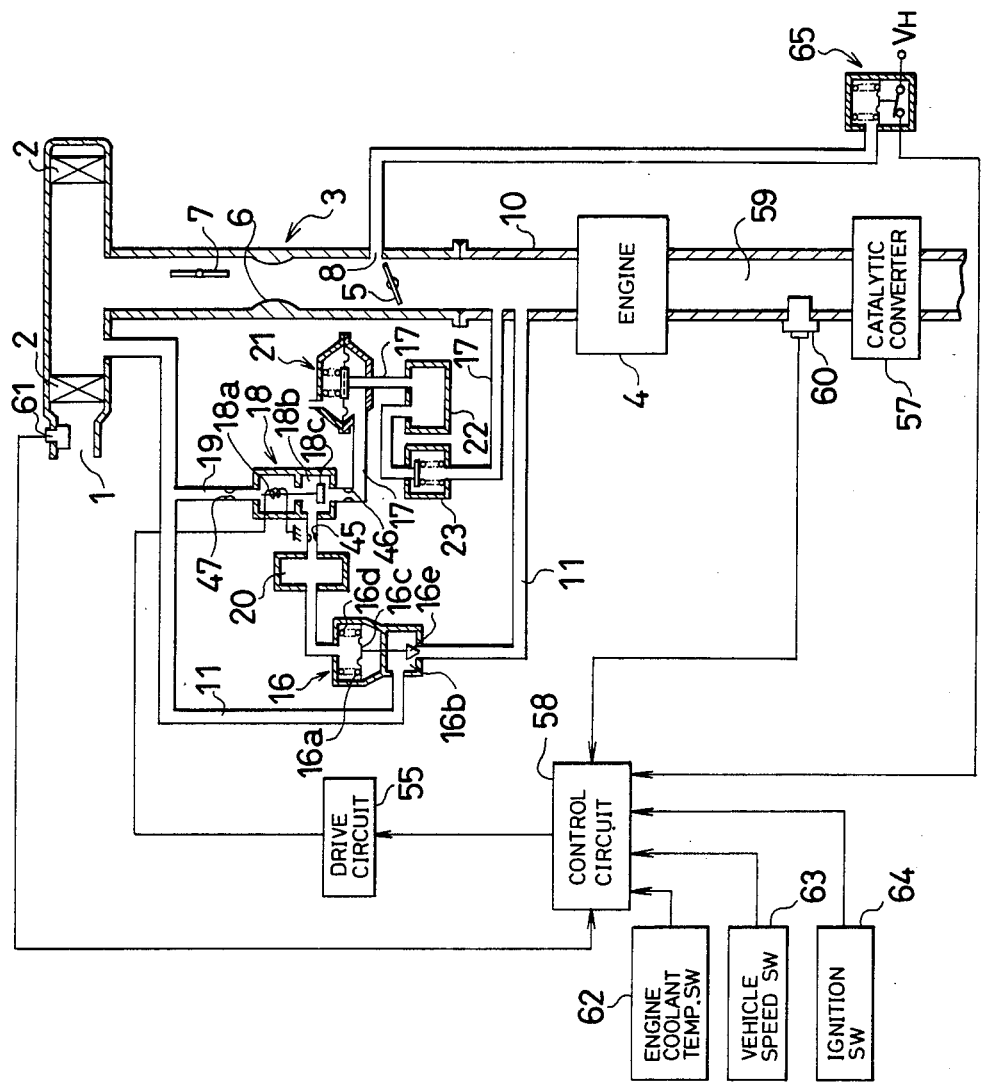
FIG. 3 is a schematic diagram showing the construction of an embodiment of the air intake side secondary air supply system of the invention.

In FIG. 3, the intake air taken at an atmospheric air inlet port 1 is drawn into an internal combustion engine 4 through an air cleaner 2, and a caburetor 3. The carburetor 3 has a throttle valve 5 and a venturi 6 formed on the upstream side of the throttle valve 5. A choke valve 7 is provided on the upstream side of the venturi 6. In the bore of the carburetor, a vacuum detection hole 8 is provided adjacent to the throttle valve 5 in such a manner that it is on the upstream side of the throttle valve 5 when it is closed and on the downstream side of the throttle valve 5 when it is opened. An air intake side secondary air supply passage 11 is provided to make a communication between the inside of the air cleaner 2 in the vicinity of an air outlet port, and an intake manifold 10, downstream of the throttle valve 5. The secondary air supply passage 11 is provided with an air control valve 16 which is made up of a vacuum chamber 16a, a valve chamber 16b, a diaphragm 16c, a valve spring 16d, and a valve element 16e having a tapered form. The air control valve 16 varies the sectional area of the secondary air supply passage 11 in accordance with the magnitude of a vacuum supplied to the vacuum chamber 16a, so that the sectional area increases as the magnitude of the vacuum increases.

The vacuum chamber 16a is communicated with the intake manifold 10 by means of a vacuum supply passage 17. The vacuum supply passage 17 is provided with a solenoid valve 18 which includes a solenoid 18a, a valve chamber 18b forming a part of the vacuum supply passage 17, and a valve element 18c magnetically connected to the solenoid 18a. The valve chamber 18b is communicated with the atmosphere via an atmospheric pressure supply passage 19. When the solenoid 18a is deenergized, the vacuum supply passage 17 is closed and a part of the vacuum supply passage 17 on the side of the vacuum chamber 16a is communicated with the atmospheric pressure supply passage 19 via the valve chamber 18b. The vacuum supply passage 17 is provided with a surge tank 20 on the side of the vacuum chamber 16a. The vacuum supply passage 17 is further provided with a constant vacuum control valve 21, a storage tank 22, and a non-return valve 23 in this order, on the side of the intake manifold 10 from the solenoid valve 18. The constant vacuum control valve 21 is adapted to stabilize the magitude of the vacuum supplied from the intake manifold 10 to a value Pr. The non-return valve 23 is adapted to allow only the flow of the air directed to the intake manifold 10. In the vacuum supply passage 17 on both sides of the solenoid valve 18, there are provided orifices 45 and 46. Also, an orifice 47 is provided in the atmospheric pressure supply passage 19.

The solenoid 18a of the solenoid valve 18 is connected to a control circuit 58 through a drive circuit 55. The control circuit 58 is further provided with an output signal of an oxygen sensor 60 which is mounted in an exhaust manifold 59 and produces an output signal having a level $V_{O2}$ corresponding to an oxygen concentration of an exhaust gas and which increases with the oxygen concentration. The control circuit 58 further receives output signals of an intake air temperature switch 61, an engine coolant temperature switch 62, a vehicle speed switch 63, an ignition switch 64, and a vacuum switch 65. The intake air temperature switch 61 is disposed in the vicinity of the air cleaner 2 and adapted to turn on when the temperature of the intake air is above a first predetermined level, 18 deg. C. for example. The engine coolant temperature switch 62 turns on when the temperature of the engine coolant is above a second predetermined level, 70 deg. C. for example. The vehicle speed switch 63 turns on when the vehicle speed is above a predetermined level, 15 miles/h for example. The vacuum switch 65 is adapted for detecting the magnitude of the vacuum Pc in the vacuum detection hole 8. When the magnitude of the vacuum Pc is smaller than a predetermined level, 30 mmHg for example, the vacuum switch 65 turns on. When turned on, these switches 61 through 65 respectively produce a high level signal having a voltage level $V_H$.

Figure 4:
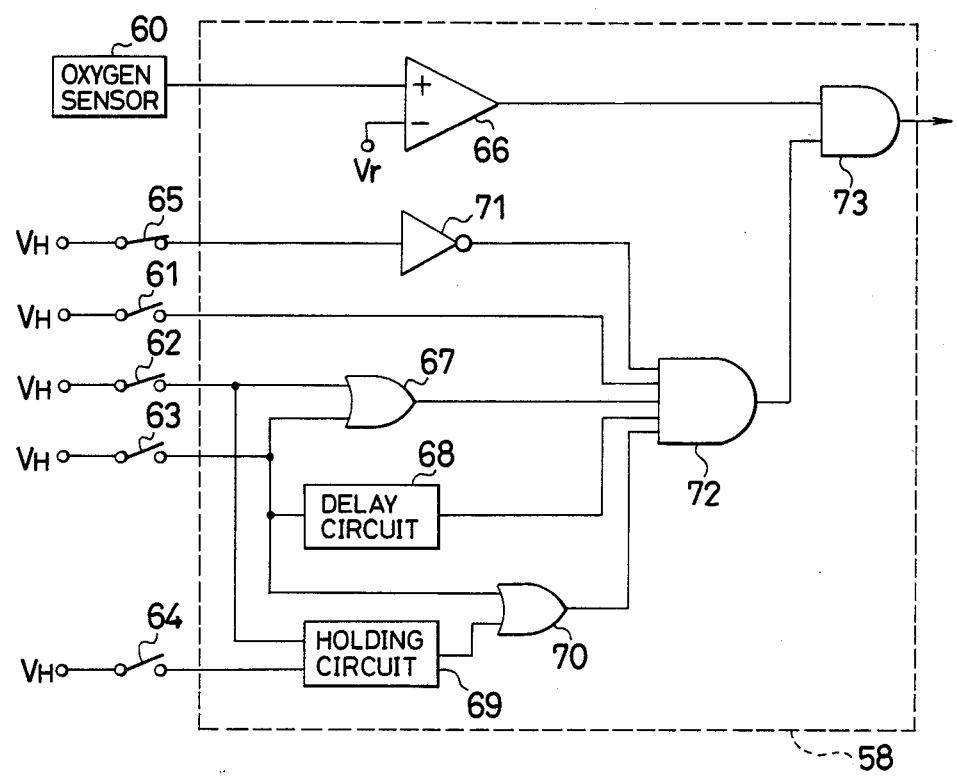
FIG. 4 is a block diagram showing the construction of the control circuit of the system of FIG. 3.

As shown in FIG. 4, the control circuit 58 includes a comparator 66 for comparing the output signal $V_{O2}$ of the oxygen sensor 60 with a predetermined reference voltage Vr, an OR circuit 67 for the function of logical OR between the output signal of the engine coolant temperature switch 62 and the output signal of the vehicle speed switch 63, a delay circuit 68 for producing a delay signal indicating a change in the output signal level of the vehicle speed switch 63 and having a predetermine delay time, 3 minutes for example, when the output signal level of the vehicle speed switch 63 turns from the high level to the low level. The control circuit 58 further includes a holding circuit 69 which continously produces a low level signal when the low level signal is produced by the engine coolant temperature switch 62 at the time of the turn on of the ignition switch 64, an OR circuit 70 for the funtion of logical OR between the output signal of the holding circuit 69 and the output signal of the vehicle speed switch 63, an inverter 71 connected to the output terminal of the vacuum switch 65, an AND circuit 72 for the logical AND function among the output signals of the intake air temperature switch 61, OR circuits 67 and 70, delay circuit 68 and inverter 71, and an AND circuit 73 for the function of logical AND between the output signal of the comparator 66 and the output signal of the AND circuit 72. An output signal of the AND circuit 72 is then supplied to the drive circuit 55.

The operation of the air intake side secondary air supply system of the invention having the above consturction will be explained hereinafter.

In the control circuit 58, when the air-fuel ratio is rich, the output signal level $VO_2$ of the oxygen sensor 60 becomes higher than the reference level Vr ($VO_2 \geq Vr$). Therefore, the comparator 66 produces the high level output signal. Conversely, if the air-fuel ratio is lean, the output signal level $VO_2$ of the oxygen sensor becomes lower than the reference voltage Vr ($VO_2 < Vr$). In the normal engine operation after the engine has warmed up, the vacuum switch 65 is turned off and other switches 61 through 64 are turned on. Therefore, the AND circuit 72 produces the high level output signal. Accordingly, the output signal of the AND circuit 73 varies in the same manner as the output signal of the comparator 66. Thus, when the rich air-fuel mixture is detected from the level of the output signal of the oxygen sensor 60, the AND circuit 73 produces the high level output signal which in turn is supplied to the drive circuit 55 as a rich signal. When the air-fuel ratio is detected to be lean in terms of the output signal of the oxygen sensor 60, the AND circuit 73 produces a low level output signal to be supplied to the drive circuit 55 as a lean signal.

When the lean signal is supplied to the drive circuit 55, the solenoid 18a of the solenoid valve 18 is deenergized, thus the solenoid valve 18 is made unoperated. Conversely, when the rich signal is applied, the solenoid 18a is energized and the solenoid valve 18 is made operated.

When, the solenoid valve 18 is unoperated, the vacuum supply passage 17 is closed and the atmospheric pressure supply passage 19 is communicated with the vacuum supply passage 17 on the side of the vacuum chamber 16a. Therefore, the vacuum in the vacuum chamber 16a gradually decreases and the valve element 16e of the air control valve 16 is gradually moved in the closing direction. Thus, the air intake side secondary air supply passage 11 is closed and the air-fuel ratio of the mixture is controlled to the rich side since the secondary air is not supplied to the engine through the air intake side secondary air supply passage 11.

When, on the other hand, the solenoid valve 18 is made operated from the unoperated state, the communication through the vacuum supply passage 17 is made and the passage to the atmospheric pressure supply passage 19 is closed at the same time. Therefore, the vacuum Pr is supplied to the vacuum chamber 16a and the pressure within the vacuum chamber 16a gradually approaches the vacuum Pr. Thus, the air control valve 16 is opened and the secondary air starts to flow through the air intake side secondary air passage 11. As the vacuum in the vacuum chamber 16a approaches the vacuum Pr, the opening degree of the air control valve 16, i.e., the sectional area of the air control passage, is gradually increased to increase the amount of the secondary air. Thus, the secondary air is supplied to the engine through the air intake side secondary air supply passage 11 and the air-fuel ratio of the mixture is controlled to the lean side. The amount of the secondary air supplied to the engine increases with time.

When the solenoid valve 18 is made unoperated from the operating state, the vacuum supply passage 17 is closed and the atmospheric pressure supply passage 19 is communicated with the vacuum supply passage 17 on the side of the vacuum chamber 16a at the same time, as mentioned above. Therefore, the vacuum chamber 16a is supplied with the atmospheric pressure and the pressure level in the vacuum chamber 16a gradually approaches the atmospheric pressure. Thus the sectional area of the air intake side secondary air passage 11 is gradually decreased and the amount of the secondary air is reduced.

As explained above, when the air-fuel ratio is controlled to the stoichiometric value, the rich signal and the lean signal are produced alternatively and continuously so that the amount of the secondary air in the air intake side secondary air passage 11 is gradually increased during the presence of the rich signal and gradually decreased during the presence of the lean signal. In this way, the integral (I) control is performed.

The operation of the system when the engine is idling during the cold start period will be further explained. At the time of the beginning of the cold start period in which the engine coolant temperature is below the second predetermined temperature level, the engine coolant temperature switch 62 produces the low level output signal. Therefore, the holding circuit 69 produces the low level output signal. On the other hand, when the engine is idling at the beginning of the cold start period, the choke valve is closed and the fast idle device shown in FIG. 1 is actuated to open the throttle valve 5 wider than the predetermined opening degree. Thus, the air-fuel ratio of the mixture is controlled to the rich side. Since the vehicle speed is, of course, lower than the predetermined speed in the state of idling operation, the vehicle speed sensor 63 produces a low level signal. Therefore, the output signals of the OR circuits 67 and 70 turn to the low level, and the AND circuit 73 supplies the low level signal to the driving circuit 55 regardless of the output signal level of the comparator 66. As a result, the drive circuit 55 stops the drive of the solenoid valve 18 as in the case of the application of the lean signal. Therefore, the solenoid valve 55 is made unoperated, and the feedback control or air-fuel ratio is stopped.

When, afterwards, the engine coolant temperature has reached the second predetermined temperature level by the warming up of the engine after the start of the engine, the engine coolant temperature switch 62 produces the high level output signal. Therefore, the output signal of the OR circuit 67 turns to the high level. In this state, since the temperature of the intake air is above the first predetermined level and the throttle valve 5 is open, the vacuum switch 65 produces the low level signal, and the inverter 71 supplies the high level signal to the AND circuit 72. On the other hand, since the output signal level of the OR circuit 70 remains low, the output signal level of the AND circuit 72 remains low irrespective of the output signal level of the inverter 71. Therefore, even though the output signal of the inverter 71 turns to the high level, indicating that the condition for starting the air-fuel ratio feedback control in the normal operation of the engine is satisfied, the air-fuel ratio feedback control system remains unoperated because the opening of the throttle valve 5 is caused by the fast idle system and the choke valve is operated to be closed.

On the other hand, when the idling of the engine is continued for a predetermined time period after the start of the engine and consequently the intake air temperature has reached the first predetermined temperature level and the engine coolant temperature has reached the second predetermined temperature level, the condition for the start of the air-fuel ratio feedback control in the normal operation of the engine will be satisfied. However, as shown in FIG. 2, the opening angle of the choke valve remains smaller than 40 degrees when three minutes have passed after the start of the engine, and the opening angle of the throttle valve by the operation of the fast idle system is at around 5 degrees. Therefore, the engine operation will be adversely affected by the substantially closed choke valve, if the air-fuel ratio feedback control is started under this condition. Therefore, when the predetermined time period has passed, the output signal of the delay circuit turns to the low level and the low level output signal is supplied to the AND circuit 72. Thus, the suspension of the air-fuel ratio feedback control is continued.

As will be appreciated from the foregoing, according to the present invention, air intake side secondary air supply system is adapted to be used in an internal combustion engine in which the choke valve and the fast idle system are operated when the engine is idling during a cold start operation. The operation of the fast idle system for opening the throttle valve is detected and the air-fuel ratio is controlled to the rich side by the suspension of the air-fuel ratio feedback control. Thus, it becomes possible to avoid the problem of the conventional system in that the condition for starting the air-fuel ratio feedback control is satisfied simply when the intake air temperature and the engine coolant temperature have respectively raised above the predetermined temperature levels and the throttle valve is opened by the operation the fast idle system.

Thus, the supply of the air intake side secondary air, which in turn causes the hunting of the engine speed, is prevented.

What is claimed is:

1. An air intake side secondary air supply system for an internal combustion engine equipped with a choke valve whose opening angle varies as the engine warms up and is arranged to close when the engine is cold so as to provide a rich mixture, and a fast idle system having a cam mechanism linked with the choke valve for varying a minimum opening angle of a throttle valve as the engine warms up, comprising:
   an air-fuel ratio detection means for detecting an air-fuel ratio from a composition of an exhaust gas of the engine and producing an air-fuel ratio detection signal indicative of the result of the detection of air-fuel ratio;
   an air intake side secondary air supply means for suppyling secondary air on the downstream side of said throttle valve in accordance with the content of said air-fuel ratio detection signal;
   an operating state detection means for detecting a predetermined operating state in which said throttle valve is opened by means of said fast idle system, and producing an operating state detection signal; and
   a control means for suspending the supply of the secondary air on the downstream side of said throttle valve upon presence of said operating state detection signal, thereby controlling the air-fuel ratio to a rich side.

2. An air intake side secondary air supply system for an internal combustion engine, as set forth in claim 1, wherein said operating state detection meams is adaped to produce said operating state detection signal when an engine coolant temperature is below a predetermined temperature level at the time of start of the engine and the engine is idling.

3. An air intake side secondary air supply system as set forth in claim 1, wherein said operating state detection means is adapted to produce said operating condition detection signal when the idling of the engine has continued for a predetermined time period after the start of the engine.

4. An air intake side secondary air supply system as set forth in claim 1, further comprising vacuum detection means for detecting the magnitude of vacuum in a vacuum detection port located in an intake pipe at a position which is upstream of said throttle valve when said throttle valve is completely closed, and downstream of said throttle valve when said fast idle system is actuated to open said throttle valve, and an output signal of said vacuum detection means in supplied to said control means so that the supply of said secondary air is normally enabled when said magnitude of vacuum in said vacuum detection port is greater than a predetermined level.

* * * * *